(12) United States Patent
Kim et al.

(10) Patent No.: US 10,717,859 B2
(45) Date of Patent: Jul. 21, 2020

(54) COMPOSITION FOR PREPARING SAN COPOLYMER, SAN COPOLYMER, PREPARATION METHOD THEREFORE, HEAT-RESISTANT ABS RESIN BLEND COMPRISING SAME, AND HEAT-RESISTANT ABS PELLETS

(71) Applicant: LG CHEM, LTD., Seoul (KR)

(72) Inventors: Gyu Sun Kim, Daejeon (KR); Chang Hun Han, Daejeon (KR); Dae Woo Lee, Daejeon (KR); Jae Bum Seo, Daejeon (KR); Jung Tae Park, Daejeon (KR); Eun Jung Choi, Daejeon (KR); Byoung Il Kang, Daejeon (KR); Da Eun Sung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 251 days.

(21) Appl. No.: 15/815,520

(22) Filed: Nov. 16, 2017

(65) Prior Publication Data

US 2018/0072881 A1 Mar. 15, 2018

Related U.S. Application Data

(63) Continuation of application No. PCT/KR2016/015247, filed on Dec. 23, 2016.

(30) Foreign Application Priority Data

Dec. 24, 2015 (KR) .................. 10-2015-0186084
Dec. 23, 2016 (KR) .................. 10-2016-0177898

(51) Int. Cl.

| C08F 2/02 | (2006.01) |
|---|---|
| C08F 212/12 | (2006.01) |
| C08F 220/44 | (2006.01) |
| C08F 222/10 | (2006.01) |
| C08L 25/16 | (2006.01) |
| C08L 55/02 | (2006.01) |
| C08L 25/12 | (2006.01) |
| C08F 279/04 | (2006.01) |
| C08K 5/315 | (2006.01) |
| C08F 285/00 | (2006.01) |
| C08K 5/14 | (2006.01) |

(52) U.S. Cl.
CPC ............. C08L 25/12 (2013.01); C08F 2/02 (2013.01); C08F 212/12 (2013.01); C08F 220/44 (2013.01); C08F 279/04 (2013.01); C08F 285/00 (2013.01); C08K 5/14 (2013.01); C08K 5/315 (2013.01); C08L 25/16 (2013.01); C08L 55/02 (2013.01); C08F 2500/04 (2013.01); C08F 2800/20 (2013.01); C08L 2201/08 (2013.01)

(58) Field of Classification Search
CPC ........ C08F 2/02; C08F 220/44; C08F 285/00; C08F 2500/04; C08F 2800/20; C08L 25/12; C08L 55/02
See application file for complete search history.

(56) References Cited

U.S. PATENT DOCUMENTS

| 3,010,936 | A | * | 11/1961 | Irvin ..................... C08F 279/04 525/77 |
| 4,701,495 | A | | 10/1987 | Katto et al. |
| 4,748,205 | A | | 5/1988 | Katto et al. |
| 5,631,323 | A | * | 5/1997 | Guntherberg ......... C08F 212/10 525/71 |
| 6,593,424 | B2 | | 7/2003 | Lee et al. |
| 2003/0032747 | A1 | * | 2/2003 | Lee ........................... C08F 2/06 526/227 |
| 2005/0026067 | A1 | | 2/2005 | Masuda et al. |
| 2015/0284559 | A1 | * | 10/2015 | Tai ......................... C08L 55/02 525/184 |
| 2017/0247486 | A1 | | 8/2017 | Kang et al. |

FOREIGN PATENT DOCUMENTS

| CN | 1455786 A | 11/2003 |
| JP | S59-149912 A | 8/1984 |
| KR | 10-2006-0052566 A | 5/2006 |
| KR | 10-0756816 B1 | 9/2007 |
| KR | 10-0772931 B1 | 11/2007 |
| KR | 10-2009-0049470 A | 5/2009 |
| KR | 10-2015-0034979 A | 4/2015 |

(Continued)

OTHER PUBLICATIONS

KR10-2009-0049470 machine translation downloaded Sep. 28, 2019.*

(Continued)

*Primary Examiner* — Irina S Zemel
*Assistant Examiner* — Jeffrey S Lenihan

(57) ABSTRACT

The present invention relates to a composition for preparing a SAN copolymer, a SAN copolymer, a preparation method therefor, a heat-resistant ABS resin blend comprising the same, and heat-resistant ABS pellets. Specifically, the present invention provides a composition for preparing a SAN copolymer, the composition comprising a monomer mixture, and ethylene glycol dimethacrylate as a chain extender, wherein the monomer mixture comprises 60 to 75 wt % of an α-methylstyrene monomer and 25 to 40 wt % of an acrylonitrile-based monomer based on the total weight of the monomer mixture; and the ethylene glycol dimethacrylate is contained in an amount of 0.001 to 0.15 parts by weight based on 100 parts by weight of the monomer mixture.

12 Claims, No Drawings

(56) References Cited

FOREIGN PATENT DOCUMENTS

| TW | 201542606 A | 11/2015 | |
| WO | WO-2012177225 A1 | * | 12/2012 |

OTHER PUBLICATIONS

Irganox 1076 technical data sheet downloaded from http://www.gapchemical.com/Upload/file/20170323/20170323100105 88588.pdf on Sep. 28, 2019.*

Extended European Search Report for EP Application No. 16879427.9, dated Jun. 12, 2018.

Tatsuhito Matsuda et al., "Optical material having high refractive index, low specific gravity, and excellent impact resistance prepared by unsaturated nitrile-polyfunctional methacrylate-styrenic monomer copolymerization", Journal of Applied Polymer Science, Sep. 12, 1997, pp. 2247-2255, vol. 65, John Wiley & Sons, Inc.

International Search Report for International Patent Application No. PCT/KR2016/015247, dated Dec. 23, 2016.

Huang et al., "Plastic Blow Molding Technology," Chemical Industry Press, 1999, p. 443

Jiao et al., "Polymer Physics," Northwestern Polytechnical University Press, 2015, p. 331.

* cited by examiner

COMPOSITION FOR PREPARING SAN COPOLYMER, SAN COPOLYMER, PREPARATION METHOD THEREFORE, HEAT-RESISTANT ABS RESIN BLEND COMPRISING SAME, AND HEAT-RESISTANT ABS PELLETS

CROSS-REFERENCE TO RELATED APPLICATION

This application is a by-pass continuation of International Patent Application No. PCT/KR2016/015247, filed Dec. 23, 2016, which claims priority to and the benefit of Korean Patent Application No. 10-2015-0186084, filed on Dec. 24, 2015, and Korean Patent Application No. 10-2016-0177898, filed on Dec. 23, 2016, the disclosures of which are incorporated herein by reference in their entirety.

TECHNICAL FIELD

The present invention relates to a composition for preparing a SAN copolymer, a SAN copolymer, a method of preparing the same, a heat-resistant ABS resin blend including the same, and heat-resistant ABS pellets.

BACKGROUND ART

A styrene-acrylonitrile (SAN) resin, which is a copolymer resin prepared by polymerizing styrene monomer (SM) as an aromatic hydrocarbon and acrylonitrile (AN) as an unsaturated nitrile, has been widely used in parts for an electrical/electronic product, a household product, an office supply, an automobile and the like due to its excellent transparency, chemical resistance, rigidity, and the like. Also, the SAN resin may be applied to an acrylonitrile-butadiene-styrene (ABS) resin to reinforce the low heat resistance of the ABS resin.

However, the SAN resin has a heat deflection temperature of about 100 to 105° C., and thus there is a limitation in applying the SAN resin to products requiring high heat resistance.

Accordingly, in order to impart excellent heat resistance to ABS, a method of introducing an α-methylstyrene (AMS) monomer is mainly used in the preparation of a SAN resin.

However, AMS has a low depolymerization temperature and may exhibit a degradation of heat resistance caused by a large amount of oligomers generated as a polymerization temperature increases. Therefore, unlike general SAN polymerization, a low polymerization temperature should be maintained, which results in a decrease in a polymerization rate.

In order to solve the problem of decreasing a polymerization rate as described above, a method of increasing a reaction retention time or introducing an excessive amount of an initiator has been used.

However, when a reaction retention time is increased, productivity may be degraded, a final product may exhibit a poor color, or a conversion ratio may be degraded. Also, when an excessive amount of an initiator is introduced, a defective molding may be caused by a decrease in weight average molecular weight.

PRIOR-ART DOCUMENTS

Patent Documents (Patent Document 1) Korean Patent Application Publication No. 10-2015-0034979

DISCLOSURE

Technical Problem

It is an aspect of the present invention to provide a composition for preparing a SAN copolymer having a broad molecular weight distribution.

It is another aspect of the present invention to provide a method of preparing the SAN copolymer.

It is still another aspect of the present invention to provide a SAN copolymer prepared by the method of preparing the SAN copolymer and having a broad molecular weight distribution.

It is yet another aspect of the present invention to provide a heat-resistant ABS resin blend including the SAN copolymer.

It is yet another aspect of the present invention to provide heat-resistant ABS pellets prepared using the heat-resistant ABS resin blend and having excellent heat resistance and environmental stress cracking resistance (ESCR).

Technical Solution

According to an embodiment of the present invention, there is provided a composition for preparing a SAN copolymer, which includes a monomer mixture and ethylene glycol dimethacrylate as a chain extender, wherein the monomer mixture includes an α-methylstyrene monomer in an amount of 60 to 75 wt % and an acrylonitrile-based monomer in an amount of 25 to 40 wt % based on the total weight of the monomer mixture, and the ethylene glycol dimethacrylate is included in an amount of 0.001 to 0.15 parts by weight based on 100 parts by weight of the monomer mixture.

According to another embodiment of the present invention, there is provided a method of preparing a SAN copolymer, which includes preparing a composition for preparing a SAN copolymer including a monomer mixture and ethylene glycol dimethacrylate as a chain extender, wherein the monomer mixture includes an α-methylstyrene monomer and an acrylonitrile-based monomer (Step 1); and polymerizing the composition for preparing a SAN copolymer prepared in step 1 at 100 to 120° C. for 6 to 8 hours (Step 2).

According to still another embodiment of the present invention, there is provided a SAN copolymer which is formed by polymerizing a composition for preparing a SAN copolymer and has a molecular weight distribution (polydispersity index (PDI)) of 2 to 4, wherein the composition includes a monomer mixture and ethylene glycol dimethacrylate as a chain extender, and the monomer mixture includes an α-methylstyrene monomer in an amount of 60 to 75 wt % and an acrylonitrile-based monomer in an amount of 25 to 40 wt % based on the total weight of the monomer mixture, and the ethylene glycol dimethacrylate is included in an amount of 0.001 to 0.15 parts by weight based on 100 parts by weight of the monomer mixture.

According to yet another embodiment of the present invention, there is provided a heat-resistant ABS resin blend which includes an ABS resin and the SAN copolymer according to the present invention.

According to yet another embodiment of the present invention, there are provided heat-resistant ABS pellets which are prepared by mixing the heat-resistant ABS resin blend, followed by extrusion.

Advantageous Effects

Since a composition for preparing a SAN copolymer according to the present invention includes ethylene glycol methacrylate as a chain extender, when being prepared by polymerizing the composition, a SAN copolymer can exhibit a broad molecular weight distribution. Therefore, when the SAN copolymer and an ABS resin are mixed and then extruded to prepare heat-resistant ABS pellets, excellent workability is exhibited, and excellent heat resistance of the heat-resistant ABS pellets thus prepared can be maintained. Further, the heat-resistant ABS pellets including the SAN copolymer can exhibit improved environmental stress cracking resistance (ESCR).

BEST MODE

Hereinafter, to help in understanding the present invention, the present invention will be described in further detail.

Terms and words used in this specification and claims should not be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way.

Terms used in this specification are merely provided to describe embodiments of the present invention and are not intended to limit the inventive concept. As used herein, the singular forms "a," "an" and "the" are intended to include the plural forms as well, unless the context clearly indicates otherwise.

It should be understood that the terms "comprises," "comprising," "includes," "including," "has," and/or "having," when used herein, specify the presence of stated features, integers, steps, operations, elements, components and/or combinations thereof, but do not preclude the presence or addition of one or more other features, integers, steps, operations, elements, components and/or combinations thereof.

According to an embodiment of the present invention, a composition for preparing a SAN copolymer includes a monomer mixture and ethylene glycol dimethacrylate as a chain extender, wherein the monomer mixture includes an α-methylstyrene monomer in an amount of 60 to 75 wt % and an acrylonitrile-based monomer in an amount of 25 to 40 wt % based on the total weight of the monomer mixture, and the ethylene glycol dimethacrylate is included in an amount of 0.001 to 0.15 parts by weight based on 100 parts by weight of the monomer mixture.

The "composition for preparing a SAN copolymer" refers to a material used to prepare a "SAN copolymer". For example, a solution including the composition for preparing a SAN copolymer may be polymerized in a reactor at a predetermined temperature to prepare a SAN copolymer.

The α-methylstyrene monomer is a type of a styrene-based monomer for preparing a SAN copolymer, and may be included in an amount of 60 to 75 wt %, specifically, in an amount of 68 to 72 wt % based on the total weight of the monomer mixture. A SAN copolymer prepared by using an α-methylstyrene monomer within the above range may exhibit excellent heat resistance and an excellent polymerization conversion ratio.

The acrylonitrile-based monomer is, for example, one or more selected from the group consisting of acrylonitrile, methacrylonitrile, and ethacrylonitrile. The acrylonitrile-based monomer may be included in an amount of 25 to 40 wt %, specifically, 28 to 32 wt % based on the total weight of the monomer mixture. When a SAN copolymer is prepared using an acrylonitrile-based monomer within the above range, an appropriate polymerization rate may be maintained, and the SAN copolymer thus prepared may exhibit excellent heat resistance.

The ethylene glycol dimethacrylate may be included as a chain extender in the composition for preparing a SAN copolymer.

Specifically, the chain extender may serve to extend a main chain of a polymer. When the ethylene glycol dimethacrylate is used as a chain extender for preparing a SAN copolymer, the SAN copolymer thus prepared may exhibit a broad molecular weight distribution, as indicated by a polydispersity index (PDI). Therefore, when the SAN copolymer and an ABS resin are mixed and then extruded to prepare heat-resistant ABS pellets, excellent workability may be exhibited, and excellent heat resistance of the heat-resistant ABS pellets thus prepared may be maintained, and improved environmental stress cracking resistance (ESCR) may also be exhibited.

The ethylene glycol dimethacrylate may be included in an amount of 0.001 to 0.15 parts by weight, specifically, 0.03 to 0.06 parts by weight based on 100 parts by weight of the monomer mixture. When the ethylene glycol dimethacrylate is included within the above range, the molecular weight of the SAN copolymer thus prepared is not excessive, and an appropriate level of molecular weight distribution is obtained. Therefore, heat-resistant ABS pellets including the SAN copolymer exhibit excellent workability and heat resistance.

When the ethylene glycol dimethacrylate is included in an amount of less than 0.001 parts by weight, the molecular weight distribution of the SAN copolymer thus prepared may not be sufficiently broadened, and when the ethylene glycol dimethacrylate is included in an amount of greater than 0.15 parts by weight, a molecular weight of the SAN copolymer thus prepared is excessively large, and thus the processability of heat-resistant ABS pellets including the SAN copolymer may be adversely affected. Also, even after the polymerization of a SAN copolymer, unreacted ethylene glycol dimethacrylate remains in a recovered solution, and when a large amount of unreacted ethylene glycol dimethacrylate is present in the recovered solution, polymerization may progress by itself in a tank for storing a recovered solution, and thus a problem may arise in a continuous process in which a recovered solution is fed again for use.

The composition for preparing a SAN copolymer may further include, for example, a styrene-based compound other than an α-methylstyrene monomer. For example, the composition includes one or more selected from the group consisting of styrene, p-bromostyrene, p-methylstyrene, p-chlorostyrene, and o-bromostyrene. The styrene-based compound other than an α-methylstyrene monomer is included, for example, in an amount of less than 10 parts by weight based on 100 parts by weight of the monomer mixture. When the styrene-based compound other than an α-methylstyrene monomer is used within the above range to prepare a SAN copolymer, an appropriate polymerization rate may be maintained, and the SAN copolymer thus prepared may exhibit excellent heat resistance.

The composition for preparing a SAN copolymer may further include an initiator. An example of the initiator is one or more of a fat-soluble peroxide-based polymerization initiator such as cumene hydroperoxide, diisopropylbenzene hydroperoxide, tert-butyl hydroperoxide, p-methane hydroperoxide, benzoyl peroxide or the like; an oxidation-reduction-based polymerization initiator including iron(II), iron(III), cobalt(II), or cerium(IV) as a metal salt and a polysaccharide dihydroxyacetone such as dextrose, glucose, fructose or the like, or a polyamine as a reducing agent; a water-soluble persulfate initiator such as potassium persulfate, sodium persulfate or the like. Particularly, the initiator may be 1,1-bis(t-butylperoxy)cyclohexane.

The initiator is included, for example, in an amount of 0.2 to 0.35 parts by weight based on 100 parts by weight of the monomer mixture.

According to another embodiment of the present invention, a method of preparing a SAN copolymer includes preparing a composition for preparing a SAN copolymer including a monomer mixture and ethylene glycol dimethacrylate as a chain extender, wherein the monomer mixture includes an α-methylstyrene monomer and an acrylonitrile-based monomer (Step 1); and polymerizing the composition for preparing a SAN copolymer prepared in step 1 at 100 to 120° C. for 6 to 8 hours (Step 2).

Hereinafter, the method of preparing a SAN copolymer according to the present invention will be described in detail for each step.

In step 1 of the method of preparing a SAN copolymer according to an embodiment of the present invention, a composition for preparing a SAN copolymer including a monomer mixture and ethylene glycol dimethacrylate as a chain extender is prepared, wherein the monomer mixture includes an α-methylstyrene monomer and an acrylonitrile-based monomer.

The ethylene glycol dimethacrylate is used as a chain extender, and the SAN copolymer thus prepared may exhibit a broad molecular weight distribution.

Based on the total weight of the monomer mixture, the α-methylstyrene monomer may be included in an amount of 60 to 75 wt %, and the acrylonitrile-based monomer may be included in an amount of 25 to 40 wt %. The ethylene glycol dimethacrylate may be included in the composition in an amount of 0.001 to 0.15 parts by weight based on 100 parts by weight of the monomer mixture.

In addition, the composition for preparing a SAN copolymer may include 1,1-bis(t-butylperoxy)cyclohexane as an initiator, and the initiator may be included in an amount of 0.2 to 0.35 parts by weight based on 100 parts by weight of the monomer mixture.

In this case, the composition for preparing a SAN copolymer may further include an organic solvent. The organic solvent may serve to adjust the viscosity of a polymerization solution, and is, for example, a hydrocarbon-based solvent, specifically, toluene. The organic solvent may be included in an amount of 0.01 to 10 parts by weight based on 100 parts by weight of the monomer mixture.

In step 2 of the method of preparing a SAN copolymer according to an embodiment of the present invention, the composition for preparing a SAN copolymer prepared in step 1 is polymerized at 100 to 120° C. for 6 to 8 hours.

Specifically, in step 2, the composition for preparing a SAN copolymer prepared in step 1 may be continuously introduced to a reactor and then polymerized at a specific temperature.

The polymerization may be performed by a common method of polymerizing a SAN copolymer and is, for example, continuous bulk polymerization or continuous polymerization, but the present invention is not limited thereto.

The continuous bulk polymerization may refer to polymerization performed using a monomer alone or along with an initiator added thereto and no solvent, and may refer to polymerization whose overall process, which includes introducing a monomer and extracting a generated polymer, is continuously performed.

In step 2, the composition for preparing a SAN copolymer is introduced to a reactor at a supply rate of 8 to 10 kg/hr, specifically, 9 to 10 kg/hr. When the supply rate is less than 8 kg/hr, a retention time of the composition for preparing a SAN copolymer is increased, and thus a molecular weight of the SAN copolymer thus prepared may be significantly increased, and a conversion ratio may be increased to above an appropriate level. When the supply rate is greater than 10 kg/hr, a polymerization conversion ratio may be decreased.

As a specific example, the continuous polymerization is performed as follows.

A polymerization solution including the composition for preparing a SAN copolymer may be introduced to a first reactor and then polymerized at a specific temperature, and the polymerization solution thus polymerized may be transported to a second reactor sequent to the first reactor and then polymerized at a temperature higher than a temperature of the first reactor.

More specifically, the temperature of the second reactor may be about 1 to 5° C. higher than the temperature of the first reactor, but the present invention is not limited thereto.

The polymerization may have a polymerization conversion ratio of 56% or more, specifically, 56% to 73%. In the present invention, when a SAN copolymer is prepared, ethylene glycol dimethacrylate may be used as a chain extender to achieve a high polymerization conversion ratio.

Meanwhile, the method of preparing a SAN copolymer may further include removing an unreacted monomer through volatilization under a temperature of 200 to 250° C. and a degree of vacuum of 25 Ton or less after the polymerization in step 2.

As described above, when an unreacted monomer is volatilized to prepare a SAN copolymer, heat resistance may be further improved, and color characteristics may also be further improved.

In this case, when the composition for preparing a SAN copolymer further includes an organic solvent, the organic solvent may be removed together with an unreacted monomer in this step.

According to still another embodiment of the present invention, a SAN copolymer is formed by polymerizing a composition for preparing a SAN copolymer and has a PDI of 2 to 4, wherein the composition includes a monomer mixture and ethylene glycol dimethacrylate as a chain extender, and the monomer mixture includes an α-methylstyrene monomer in an amount of 60 to 75 wt % and an acrylonitrile-based monomer in an amount of 25 to 40 wt % based on the total weight of the monomer mixture, and the ethylene glycol dimethacrylate is included in an amount of 0.001 to 0.15 parts by weight based on 100 parts by weight of the monomer mixture.

Specifically, the SAN copolymer may have a weight average molecular weight (Mw) of 90,000 to 150,000 and a glass transition temperature of 124 to 127° C., specifically, 125.4 to 126.8° C.

Meanwhile, the SAN copolymer may have a PDI of 2 to 4.

The PDI is a ratio (Mw/Mn) of the weight average molecular weight (Mw) and number average molecular weight (Mn) of a polymer. PDI is understood to be an indicator of molecular weight distribution.

According to yet another embodiment of the present invention, a heat-resistant ABS resin blend may include an ABS resin and the SAN copolymer.

The "heat-resistant ABS resin blend" used herein is a material used to prepare a "heat-resistant ABS pellet", and the "heat-resistant ABS pellet" is prepared, for example, by mixing the "ABS resin" and the "SAN copolymer", followed by extrusion at a predetermined temperature.

Since the heat-resistant ABS resin blend includes a SAN copolymer exhibiting a broad molecular weight distribution, an ABS resin and a SAN copolymer are easily mixed, and excellent workability is exhibited.

The ABS resin may be a copolymer including an acrylonitrile-based monomer, a conjugated diene-based compound, and an aromatic vinyl compound.

Specifically, the ABS resin is a resin prepared by graft-polymerizing a butadiene monomer with a styrene-acrylonitrile polymer, and includes the styrene-acrylonitrile polymer in an amount of 30 to 50 wt % and the butadiene monomer in an amount of 50 to 70 wt % based on the total weight of the ABS resin, wherein the styrene-acrylonitrile polymer may include a unit derived from a styrene-based compound and a unit derived from an acrylonitrile-based compound at a weight ratio of 70:30 to 80:20.

The heat-resistant ABS resin blend may include the ABS resin and the SAN copolymer at a weight ratio of 25 to 30:70 to 75.

The heat-resistant ABS resin blend may further include, for example, an antioxidant(s) such as a hindered phenol antioxidant, a phosphorus antioxidant, or a mixture thereof. When an antioxidant(s) is/are included, the heat-resistant ABS pellet thus prepared may exhibit excellent weather resistance and heat resistance.

According to yet another embodiment of the present invention, heat-resistant ABS pellets may be prepared by mixing the heat-resistant ABS resin blend, followed by extrusion.

In this case, a SAN copolymer included in a heat-resistant ABS composition to prepare the heat-resistant ABS pellets is prepared using ethylene glycol dimethacrylate, and exhibits a broad molecular weight distribution. Accordingly, when heat-resistant ABS pellets are prepared by mixing the SAN copolymer and the ABS resin, followed by extrusion, excellent workability may be exhibited, excellent heat resistance of the heat-resistant ABS pellet may be maintained, and improved ESCR may also be exhibited due to a high molecular weight of the SAN copolymer.

Specifically, the ESCR of the heat-resistant ABS pellets may be 39 to 63 seconds.

The ESCR may be obtained by measuring an elapsed time until a specimen is cracked after the middle of the specimen prepared using heat-resistant ABS pellets is coated with a thinner using a 1% strain zig.

MODE FOR INVENTION

<Example 1> Preparation of Heat-Resistant ABS Pellet

Step 1: Preparation of SAN Copolymer 95 parts by weight of a monomer mixture including an α-methylstyrene (AMS) monomer in an amount of 71 wt % and an acrylonitrile (AN) monomer in an amount of 29 wt % and 5 parts by weight of toluene were mixed to prepare a mixed solution.

With respect to 100 parts by weight of the mixed solution, 0.2 parts by weight of 1,1-bis(t-butylperoxy)cyclohexane as an initiator (0.211 parts by weight based on 100 parts by weight of the monomer mixture) and 0.05 parts by weight of ethylene glycol dimethacrylate as a chain extender (0.053 parts by weight based on 100 parts by weight of the monomer mixture) were added to the mixed solution to prepare a polymerization solution.

The polymerization solution was continuously introduced to a first reactor at a supply rate of 9 kg/hr and then polymerized at 109° C. for 3 hours. The polymerization solution thus polymerized for 3 hours was transported to a second reactor and then further polymerized at 111° C. for 4 hours.

Afterward, unreacted monomer and solvent were removed from the polymerization solution whose polymerization was terminated in a volatilization bath under a temperature of 240° C. and a degree of vacuum of 21.4 Torr, and the resulting solution was processed using a die and a pelletizer to prepare a pellet-type SAN copolymer.

Step 2: Preparation of Heat-Resistant ABS Pellet

A powdery resin prepared by graft-polymerizing butadiene monomer with a styrene-acrylonitrile polymer was prepared as an ABS resin. Here, the resin prepared by graft-polymerizing butadiene monomer with a styrene-acrylonitrile polymer was composed of 60 parts by weight of a butadiene monomer and 40 parts by weight of a styrene-acrylonitrile polymer in which a styrene monomer and an acrylonitrile monomer were polymerized at a weight ratio of 75:25.

The powdery ABS resin and the pellet-type SAN copolymer prepared in step 1 were mixed at a weight ratio of 27:73 (ABS resin:SAN copolymer) to prepare a mixture. With respect to 100 parts by weight of the mixture, 0.2 parts by weight of Irganox 1076 (IR1076) as an antioxidant was added to the mixture, and then the resulting mixture was introduced to an extruder (28 J) of 240° C. to prepare a pellet-type heat-resistant ABS pellet.

Examples 2 to 8 and Comparative Examples 1 to 5

A pellet-type heat-resistant ABS pellet was prepared in the same manner as in Example 1 except that a polymerization temperature, contents of an initiator and a chain extender, a supply rate of a polymerization solution, and a degree of vacuum were set as listed in Table 1 below.

TABLE 1

| | | Examples | | | | | | | | Comparative Examples | | | | |
|---|---|---|---|---|---|---|---|---|---|---|---|---|---|---|
| | | 1 | 2 | 3 | 4 | 5 | 6 | 7 | 8 | 1 | 2 | 3 | 4 | 5 |
| Polymerization temperature (° C.) | First reactor | 109 | 107 | 107 | 107 | 107 | 107 | 107 | 107 | 105 | 107 | 109 | 105 | 107 |
| | Second reactor | 111 | 109 | 109 | 109 | 109 | 109 | 109 | 109 | 107 | 109 | 111 | 107 | 109 |

TABLE 1-continued

|  |  | Examples | | | | | | | | Comparative Examples | | | | |
| --- | --- | --- | --- | --- | --- | --- | --- | --- | --- | --- | --- | --- | --- | --- |
|  |  | 1 | 2 | 3 | 4 | 5 | 6 | 7 | 8 | 1 | 2 | 3 | 4 | 5 |
| α-methylstyrene (AMS) monomer | Wt % based on monomer mixture | 71 | 71 | 71 | 71 | 71 | 71 | 71 | 71 | 71 | 71 | 71 | 71 | 71 |
| Acrylonitrile (AN) monomer |  | 29 | 29 | 29 | 29 | 29 | 29 | 29 | 29 | 29 | 29 | 29 | 29 | 29 |
| 1,1-bis(t-butylperoxy)cyclohexane (initiator) | ppm | 2110 | 2630 | 2630 | 2630 | 3160 | 3160 | 2630 | 2630 | 2630 | 2630 | 3160 | 2110 | 2110 |
|  | Parts by weight based on 100 parts by weight of monomer mixture | 0.211 | 0.263 | 0.263 | 0.263 | 0.316 | 0.316 | 0.263 | 0.263 | 0.263 | 0.263 | 0.316 | 0.211 | 0.211 |
| Ethylene glycol dimethacrylate (chain extender) | ppm | 530 | 530 | 530 | 530 | 1050 | 1050 | 1050 | 1050 | 0 | 0 | 0 | 0 | 0 |
|  | Parts by weight based on 100 parts by weight of monomer mixture | 0.053 | 0.053 | 0.053 | 0.053 | 0.105 | 0.105 | 0.105 | 0.105 | 0 | 0 | 0 | 0 | 0 |
| Supply rate (kg/hr) |  | 9 | 10 | 9 | 8 | 8 | 10 | 8 | 10 | 8 | 8 | 8 | 8 | 9 |
| Degree of vacuum for subsequent process (Torr) |  | 21.4 | 23.5 | 19.6 | 19.8 | 23.3 | 17.2 | 19.5 | 20.5 | 14.7 | 19.8 | 20.5 | 20.4 | 20.5 |

Experimental Example 1

The polymerization conversion ratio (%) of each SAN copolymer prepared in step 1 of Examples 1 to 8 and Comparative Examples 1 to 5 was measured using gas chromatography (GC).

In addition, the glass transition temperature, weight average molecular weight, and molecular weight distribution of each SAN copolymer prepared in step 1 of Examples 1 to 8 and Comparative Examples 1 to 5 were measured as follows.

Further, each pellet-type heat-resistant ABS pellet prepared in Examples 1 to 8 and Comparative Examples 1 to 5 was injection-molded in a form with particular length, width, and height (cm) to prepare a heat-resistant ABS pellet specimen, and then the impact strength, heat deflection temperature, color, and ESCR thereof were measured.

The measured values are shown in Table 2 below.
<Measurement Method>
Polymerization conversion ratio: measured through GC.
Glass transition temperature: measured using Pyris 6 DSC commercially available from Perkin Elmer.
Weight average molecular weight (Mw): measured as a relative value to a polystyrene (PS) standard specimen using GPC (Waters Breeze).
Polydispersity index (PDI): calculated as a ratio (Mw/Mn) of the weight average molecular weight (Mw) and number average molecular weight (Mn) of a polymer and determined after the Mn was measured using GPC (Waters Breeze).
Impact strength (¼", kg·cm/cm): measured according to ASTM D256 (Izod Impact).
Heat deflection temperature (HDT, ° C.): measured according to ASTM D648.
Color (color b): a yellow index of a specimen was measured using a Hunter Lab colorimeter.

Environmental stress cracking resistance (ESCR): determined based on an elapsed time until a specimen was cracked after the middle of a specimen was coated with a solvent using a 1% strain jig on dogbone samples having a 3.16 mm thickness, 200 mm length and 20 mm width at room temperature coated with T803 solvent from Noroobee Chemical Company LTD. In the test, the samples were coated with the solvent, and the presence of cracks was detected with the naked eye. The radius of the strain jig is 148.5 mm, so that 200 mm length samples experience 1.0% strain in the jig.

characteristics of the heat-resistant ABS pellets according to Examples 1 to 8 and Comparative Examples 1 to 5 were at equivalent levels.

Specifically, it was revealed that, since a polymerization conversion ratio of 56.5 to 72.63%, a glass transition temperature of 124.5 to 126.4° C., an impact strength of 10.6 to 12.8 kg·cm/cm, a heat deflection temperature of 101.4 to 103.2° C., and a color value of 15.6 to 18.2 were exhibited, whether or not ethylene glycol dimethacrylate was added does not adversely affect properties.

TABLE 2

|  |  | Examples | | | | | | | | Comparative Examples | | | | |
| --- | --- | --- | --- | --- | --- | --- | --- | --- | --- | --- | --- | --- | --- | --- |
|  |  | 1 | 2 | 3 | 4 | 5 | 6 | 7 | 8 | 1 | 2 | 3 | 4 | 5 |
| Polymerization conversion ratio (%) |  | 57.44 | 56.50 | 56.78 | 65.13 | 57.13 | 62.30 | 72.63 | 60.60 | 57.63 | 65.75 | 62.88 | 61.50 | 61.78 |
| Properties of SAN copolymer | Tg (° C.) | 124.8 | 125.1 | 125.4 | 125.6 | 125.4 | 124.5 | 126.8 | 125.5 | 126.4 | 125.6 | 125.5 | 125.3 | 125.2 |
|  | Mw | 93837 | 88789 | 91412 | 97223 | 93312 | 104101 | 112582 | 108704 | 82844 | 83580 | 82738 | 81350 | 80476 |
|  | PDI | 2.13 | 2.22 | 2.18 | 2.10 | 3.00 | 3.13 | 2.86 | 2.64 | 1.79 | 1.77 | 1.80 | 1.90 | 1.98 |
| Properties of heat-resistant ABS pellet | Impact strength (kg·cm/cm) | 11.1 | 11.2 | 11.4 | 12.2 | 10.6 | 11.3 | 11.5 | 11.3 | 11.7 | 11.4 | 11.9 | 12.8 | 11.4 |
|  | Heat deflection temperature (° C.) | 101.6 | 101.9 | 102.5 | 102.8 | 101.5 | 102.3 | 102.5 | 102.6 | 102.8 | 102.5 | 103.2 | 101.7 | 101.4 |
|  | Color (color "b") | 17.3 | 17.5 | 16.9 | 17.6 | 18.2 | 17.3 | 15.6 | 17.7 | 15.9 | 17.1 | 17.5 | 16.4 | 17.3 |
|  | ESCR (sec) | 43 | 45 | 46 | 48 | 39 | 44 | 61 | 63 | 25 | 31 | 37 | 33 | 32 |

As shown in Table 2, it can be seen that the SAN copolymers according to Examples 1 to 8 had a PDI of 2.1 to 3.13, whereas the SAN copolymers according to Comparative Examples 1 to 5 had a PDI of 1.77 to 1.98.

In addition, it can be seen that the SAN copolymers according to Examples 1 to 8 had a Mw of 88,789 to 112,582, whereas the SAN copolymers according to Comparative Examples 1 to 5 had a Mw of 80,476 to 83,580.

From these results, it can be seen that a molecular weight distribution of a SAN copolymer prepared with the addition of ethylene glycol dimethacrylate was increased by up to 74% compared to that of a SAN copolymer prepared without the addition of ethylene glycol dimethacrylate, and a weight average molecular weight thereof was also increased by up to 40%.

Further, it can be seen that the heat-resistant ABS pellets according to Examples 1 to 8 had an ESCR of 39 to 63 seconds, whereas the heat-resistant ABS pellets according to Comparative Examples 1 to 5 had an ESCR of 25 to 37 seconds.

From these results, it can be seen that an ESCR of a heat-resistant ABS pellet prepared using a SAN copolymer prepared with the addition of ethylene glycol dimethacrylate was improved up to 2.5 times compared to without the addition of ethylene glycol dimethacrylate.

Meanwhile, the polymerization conversion ratios and glass transition temperatures of the SAN copolymers, and the impact strengths, heat deflection temperatures, and color As a result, it can be seen that, when a SAN copolymer having an excellent molecular weight distribution is used, workability with an ABS resin is excellent, and thus overall properties of heat-resistant ABS pellets prepared by mixing the SAN copolymer and the ABS resin, followed by extrusion are maintained to a level similar to the related art. In addition, it can be seen that, since a molecular weight of a SAN copolymer is generally increased, the ESCR of heat-resistant ABS pellets prepared using the SAN copolymer is significantly improved.

While exemplary embodiments have been described above in detail, the scope of the present invention is not limited thereto but encompasses several modifications and improvements by those skilled in the art using basic concepts of embodiments of the present invention defined by the appended claims.

The invention claimed is:
1. A method of preparing a SAN copolymer comprising:
preparing a composition for preparing a SAN copolymer comprising:
a monomer mixture and ethylene glycol dimethacrylate as a chain extender,
wherein the monomer mixture includes an α-methylstyrene monomer in an amount of 60 to 75 wt % and an acrylonitrile-based monomer in an amount of 25 to 40 wt % based on the total weight of the monomer mixture, the ethylene glycol dimethacrylate is included in an amount of 0.105 to 0.15 parts by weight based on 100 parts by weight of the monomer mixture (Step 1); and polymerizing the composition for preparing a SAN copolymer prepared in step 1 at 100 to 109° C. for 6 to 8 hours (Step 2).

2. The method of claim 1, wherein the polymerization in step 2 is performed by supplying the composition for preparing a SAN copolymer at a supply rate of 8 to 10 kg/hr.

3. The method of claim 1, wherein the polymerization in step 2 has a polymerization conversion ratio of 56 to 73%.

4. The method of claim 1, wherein the polymerization in step 2 is a continuous bulk polymerization.

5. The method of claim 1, wherein the method of preparing a SAN copolymer further comprises removing an unreacted monomer through volatilization under a temperature of 200 to 250° C. and a degree of vacuum of 25 Torr or less after the polymerization in step 2.

6. A SAN copolymer formed by polymerizing a composition for preparing a SAN copolymer and having a polydispersity index (PDI) of 2.64 to 4 and a weight average molecular weight (Mw) of 90,000 to 150,000, wherein the composition includes a monomer mixture and ethylene glycol dimethacrylate as a chain extender, and the monomer mixture includes an α-methylstyrene monomer in an amount of 60 to 75 wt % and an acrylonitrile-based monomer in an amount of 25 to 40 wt % based on the total weight of the monomer mixture, and the ethylene glycol dimethacrylate is included in an amount of 0.0010.105 to 0.15 parts by weight based on 100 parts by weight of the monomer mixture.

7. A heat-resistant ABS resin blend comprising an ABS resin and the SAN copolymer of claim 6.

8. The heat-resistant ABS resin blend of claim 7, wherein the ABS resin and the SAN copolymer are included at a weight ratio of 25:75 to 30:70.

9. The heat-resistant ABS resin blend of claim 7, wherein the ABS resin is a resin prepared by graft-polymerizing a butadiene monomer with a styrene-acrylonitrile polymer and includes the styrene-acrylonitrile polymer in an amount of 30 to 50 wt % and the butadiene monomer in an amount of 50 to 70 wt % based on the total weight of the ABS resin, wherein the styrene-acrylonitrile polymer includes a unit derived from a styrene-based compound and a unit derived from an acrylonitrile-based compound at a weight ratio of 70:30 to 80:20.

10. The heat-resistant ABS resin blend of claim 7, wherein the heat-resistant ABS resin blend further comprises a hindered phenol antioxidant, a phosphorus antioxidant, or a mixture thereof.

11. Heat-resistant ABS pellets prepared by mixing the heat-resistant ABS resin blend of claim 7, followed by extrusion.

12. The heat-resistant ABS pellets of claim 11, wherein the heat-resistant ABS pellets have an environmental stress cracking resistance (ESCR) of 39 to 63 seconds.

* * * * *